United States Patent Office 3,443,020
Patented May 6, 1969

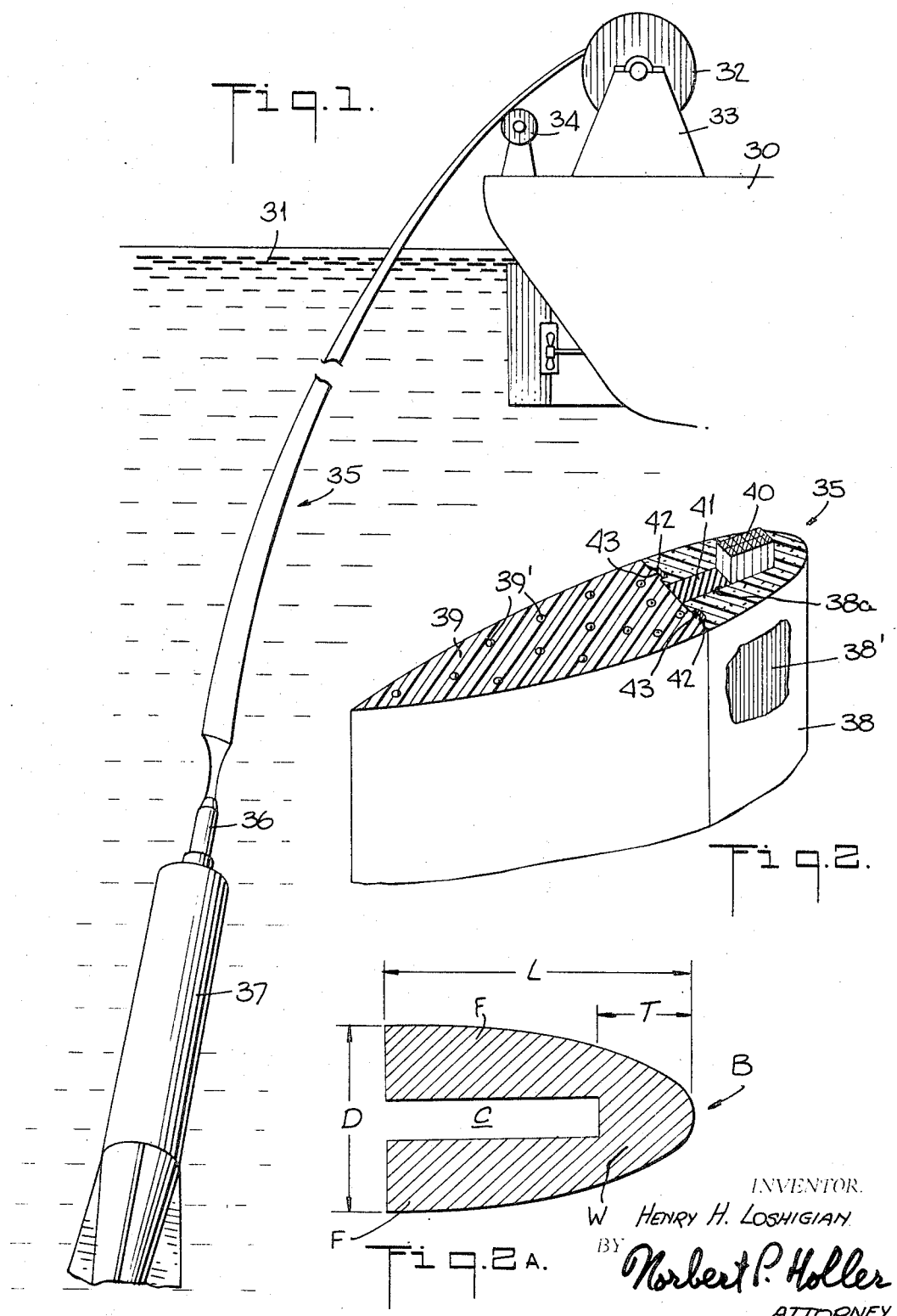

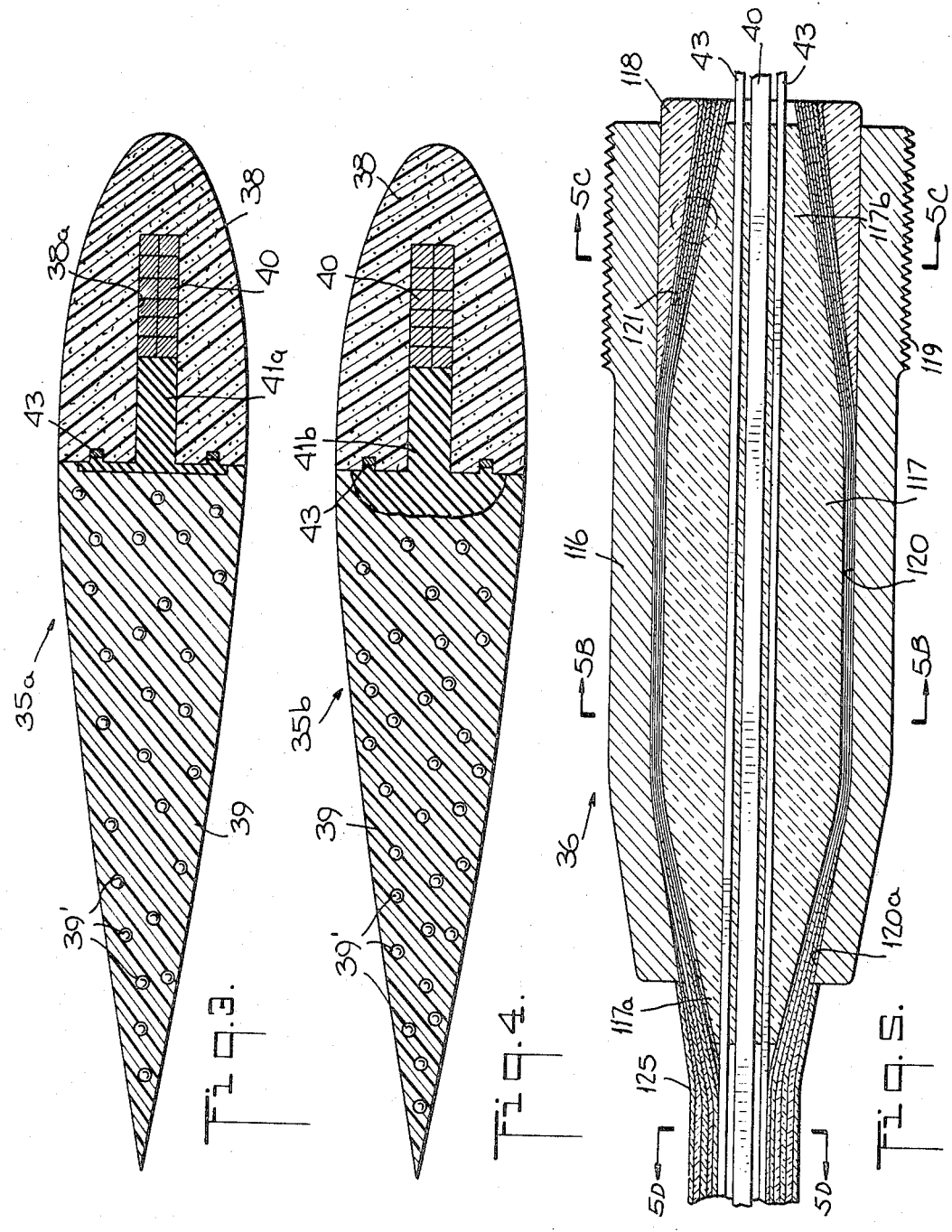

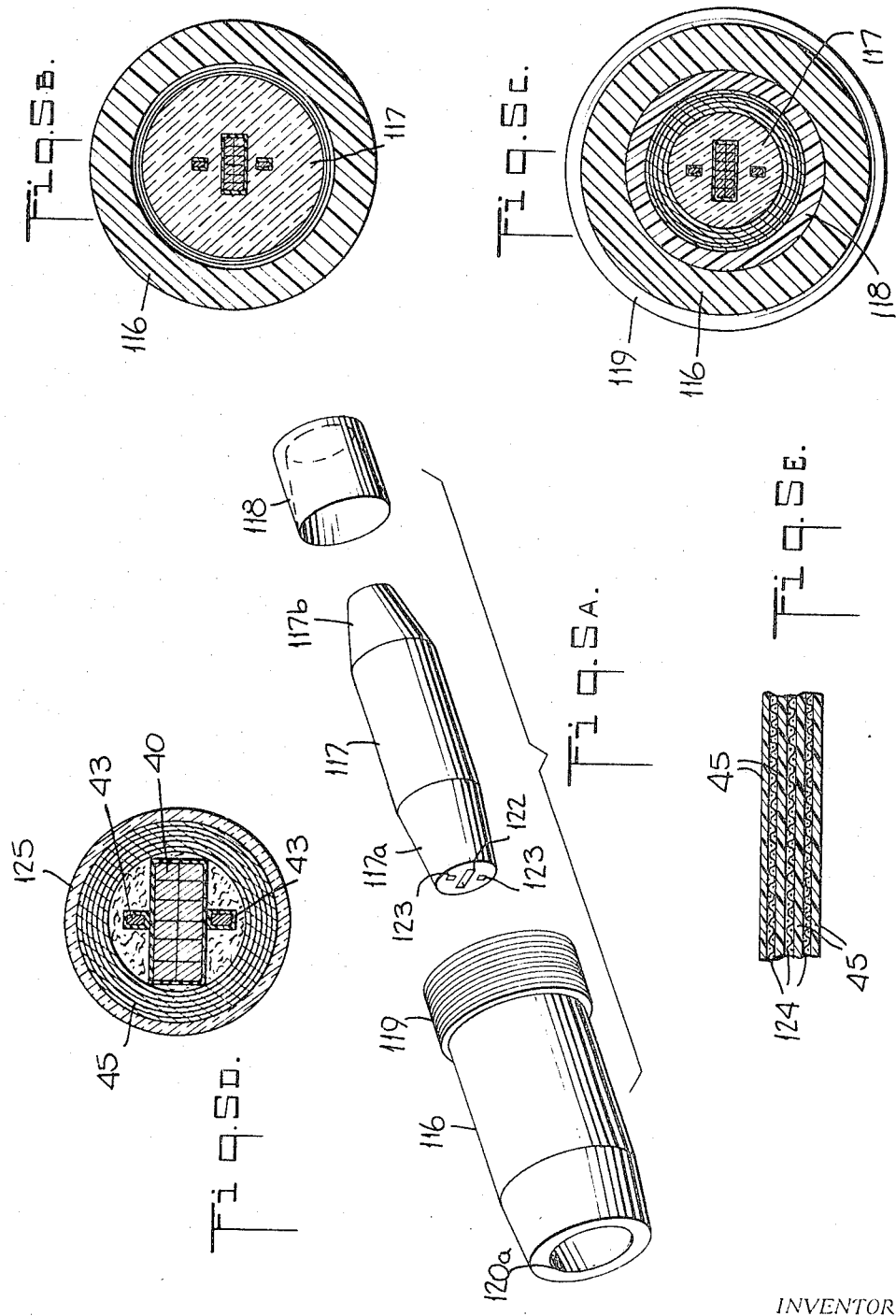

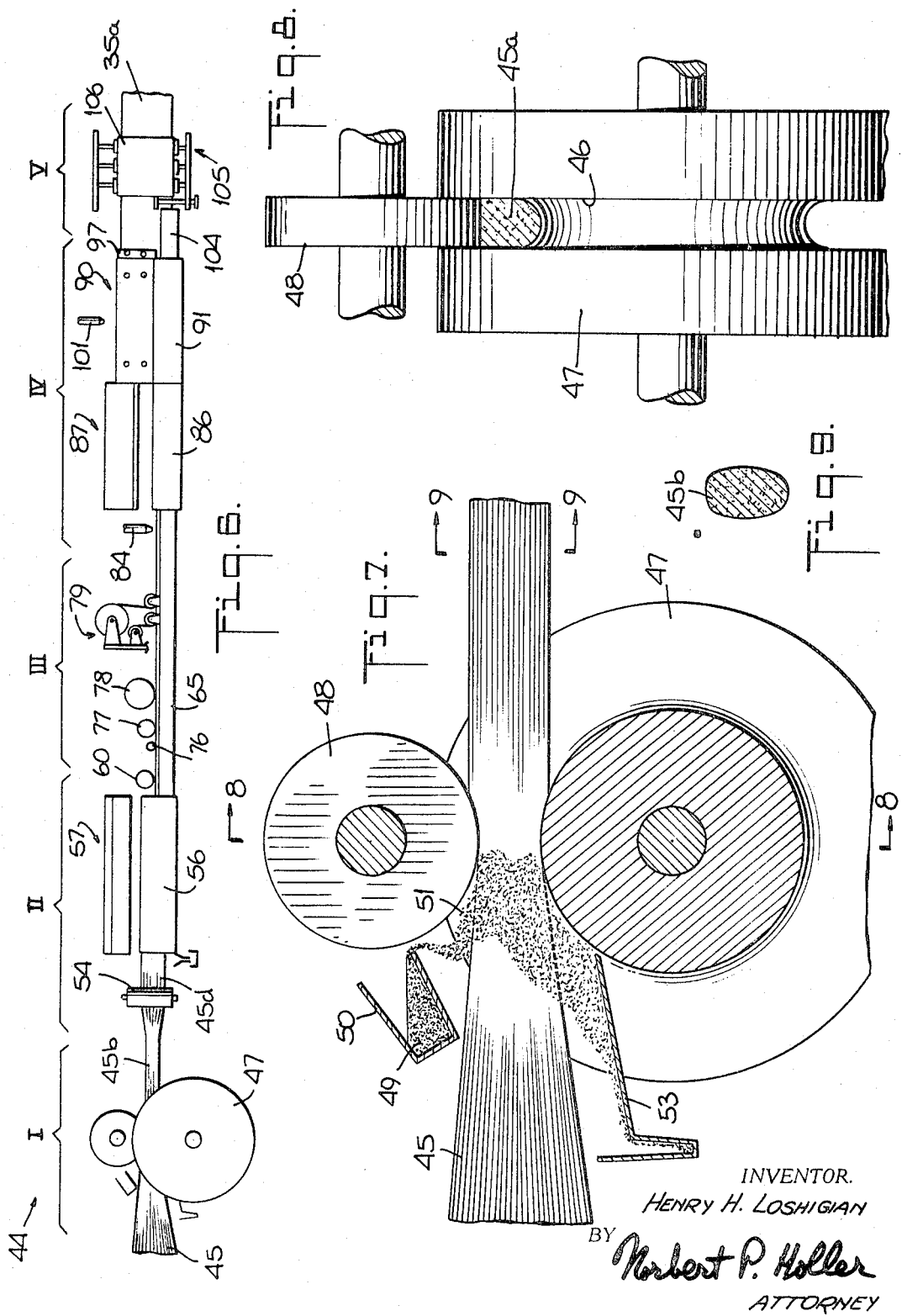

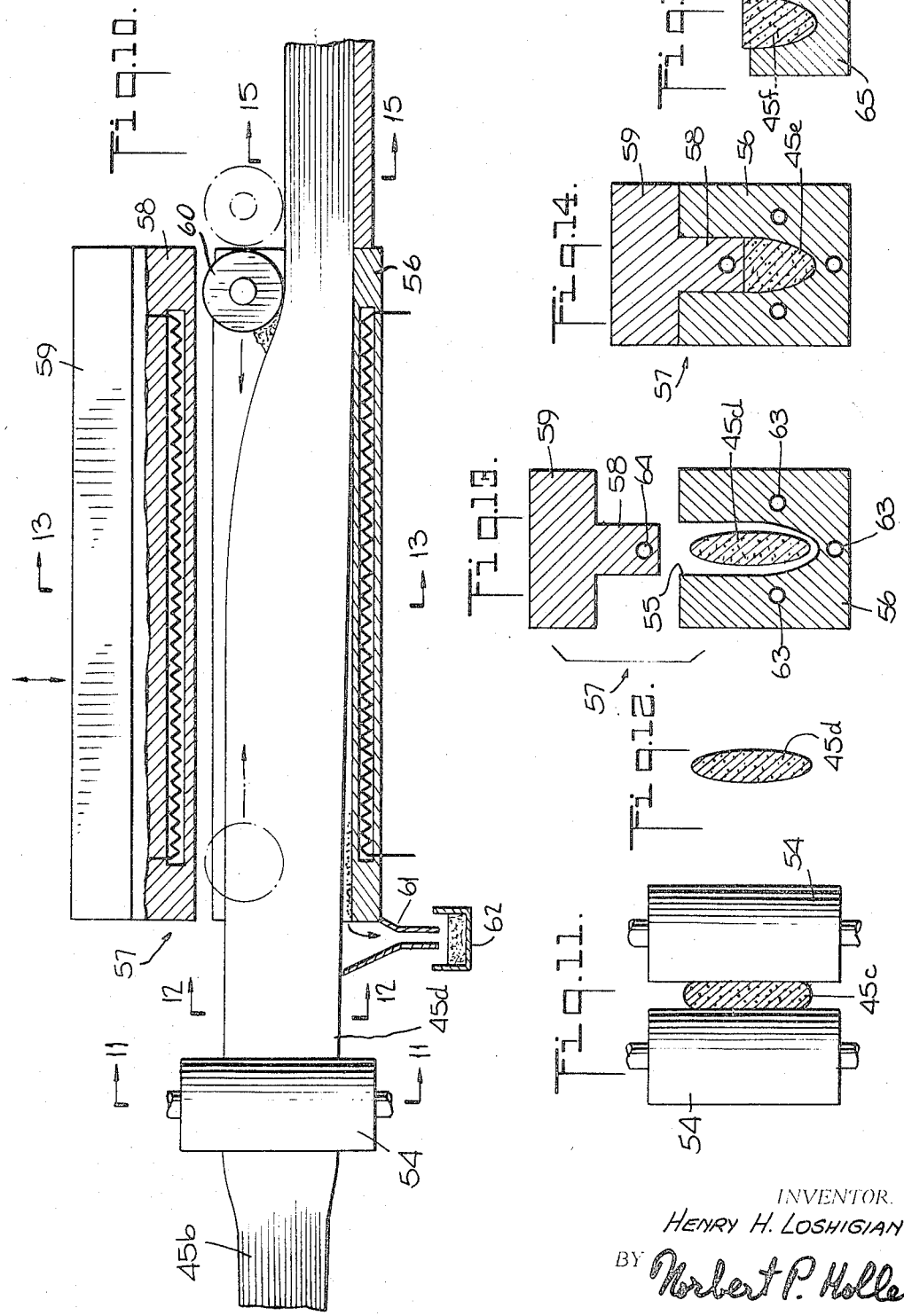

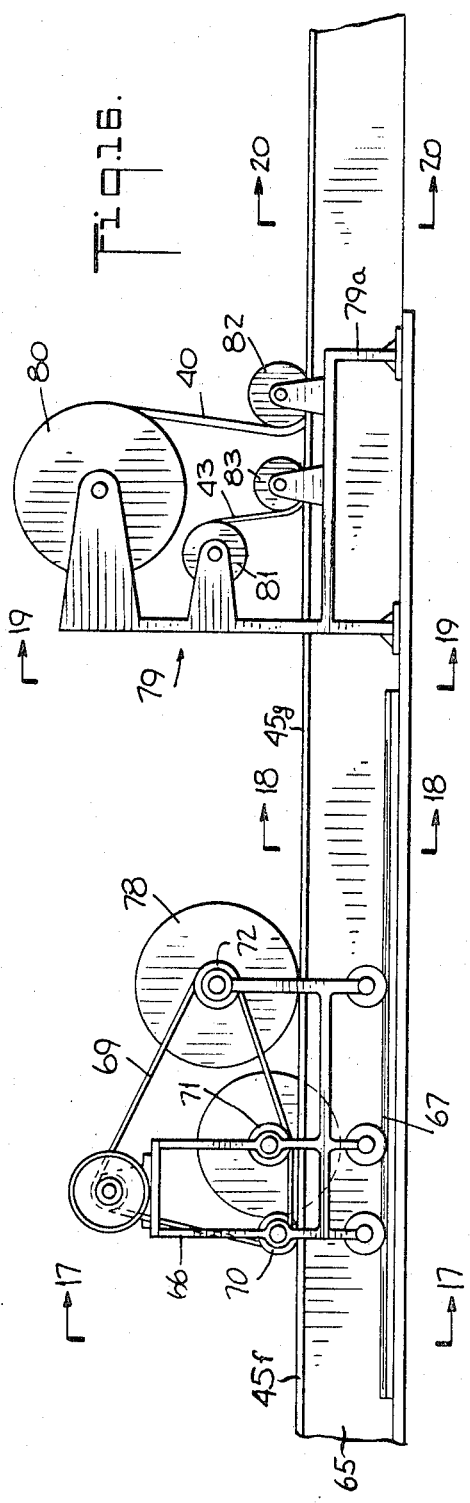
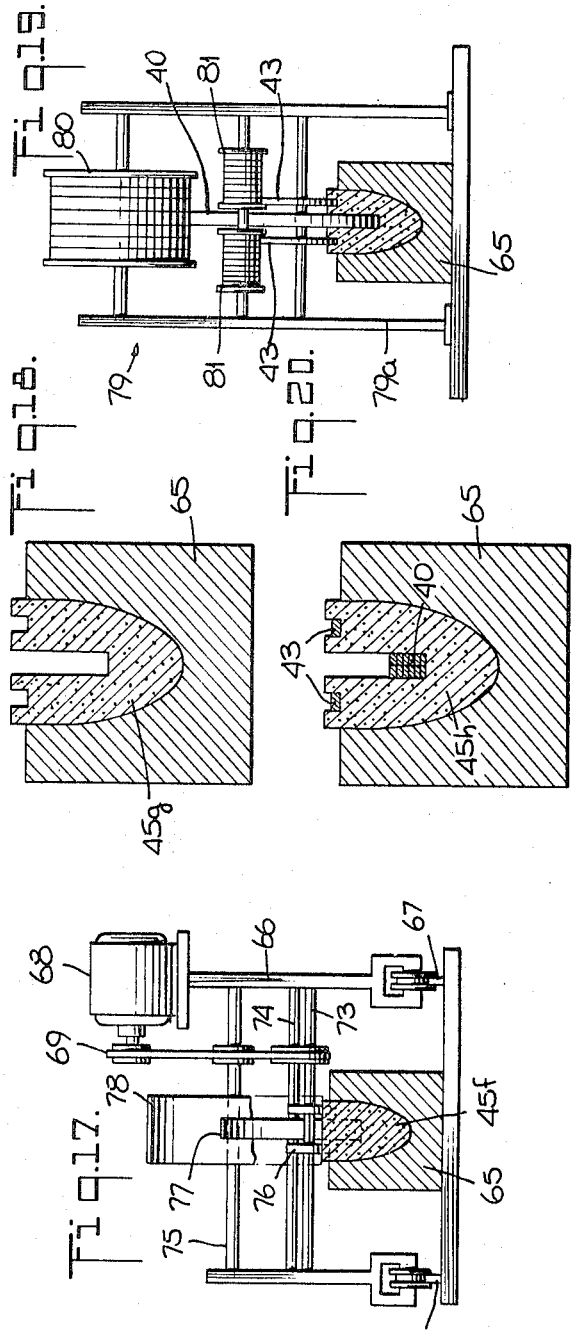

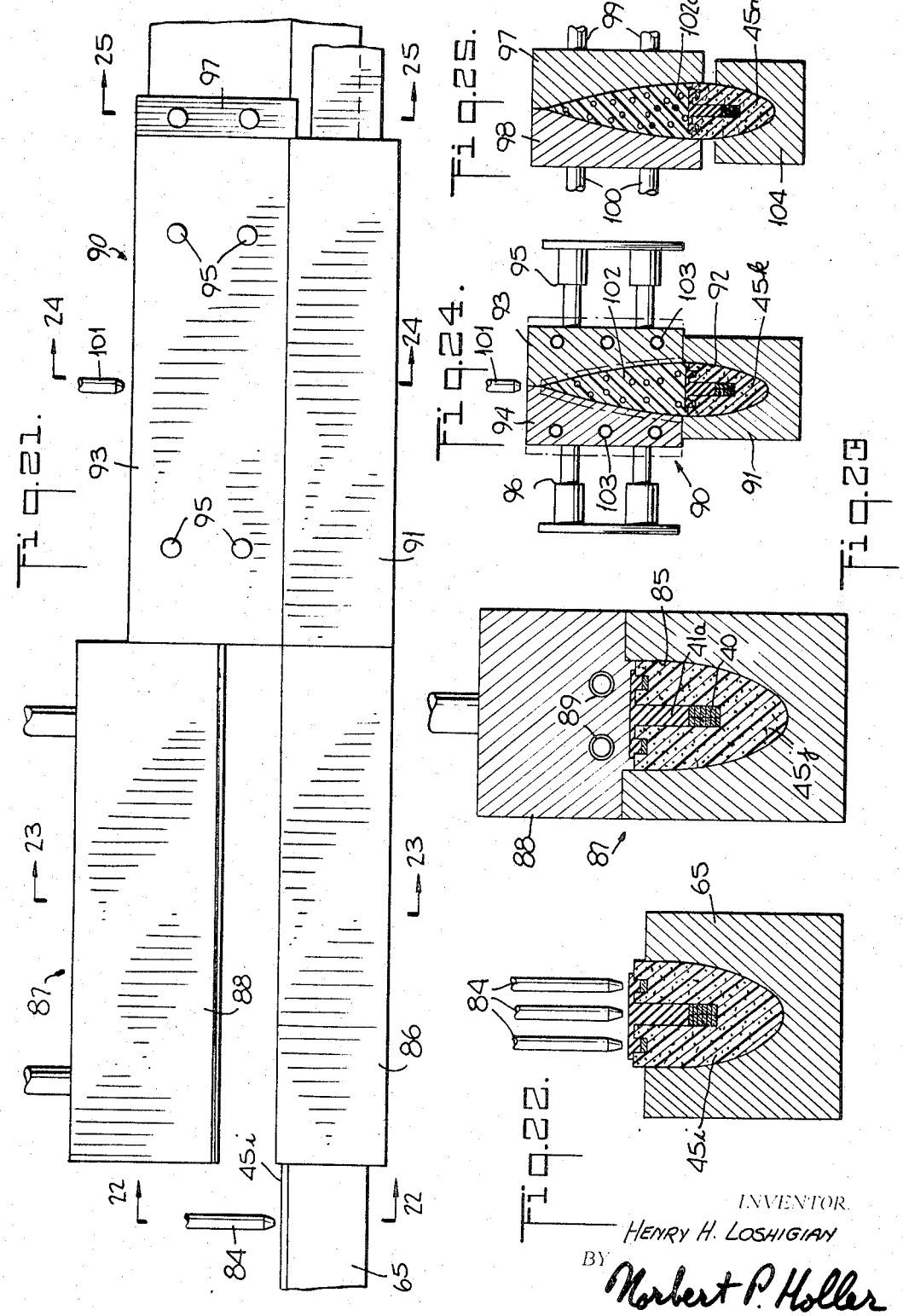

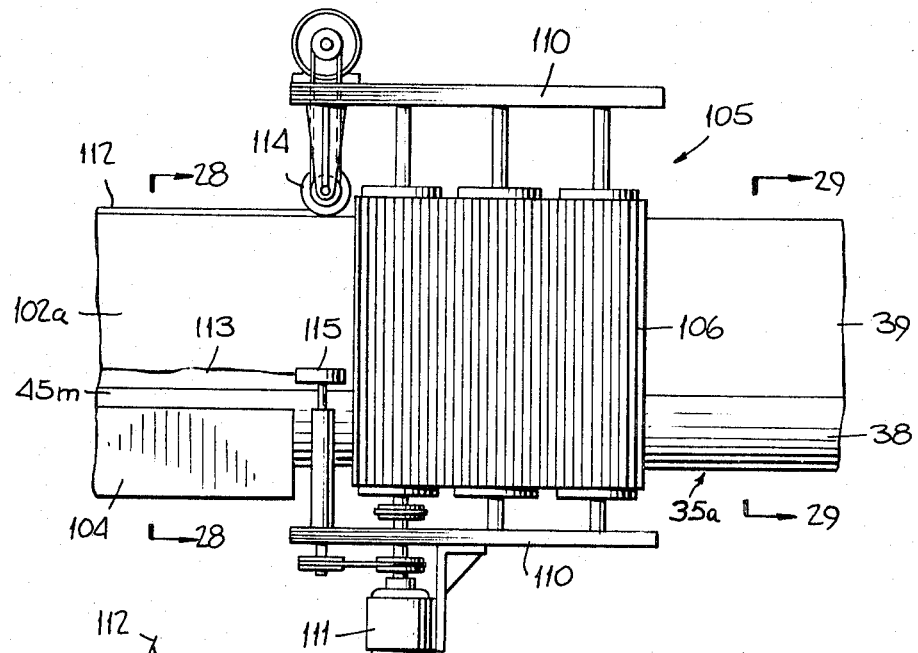
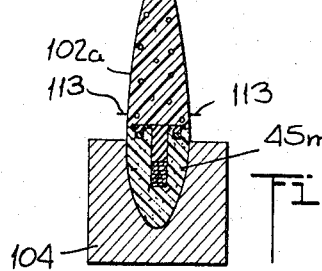
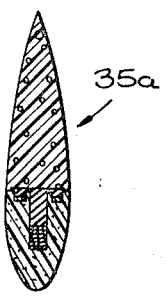
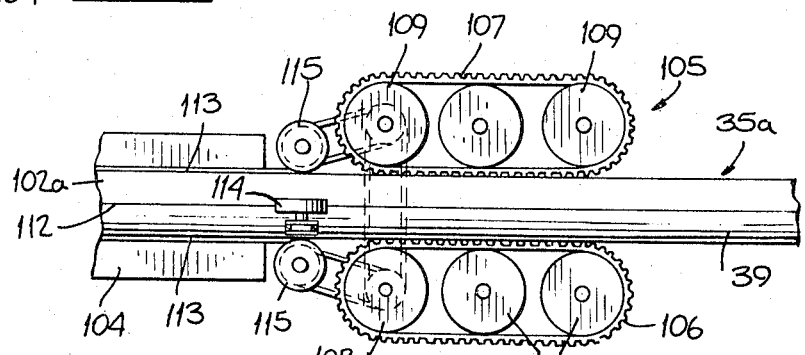

3,443,020
FAIRED CABLE
Henry H. Loshigian, Elmhurst, N.Y., assignor to Uniroyal, Inc., New York, N.Y., a corporation of New Jersey
Filed Nov. 22, 1967, Ser. No. 685,075
Int. Cl. H01b 7/12
U.S. Cl. 174—101.5                 15 Claims

ABSTRACT OF THE DISCLOSURE

A continuous, longitudinally unsectioned, faired underwater guidance cable of substantial length for submerged detection and exploration devices is disclosed, together with a method of manufacturing such cable, and the structure and method of assembly of end couplings therefor. The cable body has the cross-sectional contours of an airfoil that is symmetric with respect to its chord line and is designed so that its shear center is located in the immediate vicinity of the leading edge of the cable and a considerably greater distance forward of its center of pressure than the centroid of the strength member section, and that its center of gravity is located approximately at or slightly forward of its center of pressure, and that it has a low drag coefficient and low torsional rigidity. The load-bearing relatively less flexible, resin and filament forward strength member preferably is generally channel-like or U-shaped in cross-section and houses the non-load-bearing electrical conducting and insulating elements of the cable, and a non-load-bearing relatively more flexible, isotactic foam aft or tail member which is generally triangularly shaped in cross-section, is formed into an integral entity with the strength member by a continuous sequence of intermittent shaping and molding operations in respective portions of an assembly line-like apparatus to build successive cable portions up step by step.

This invention relates to faired cables principally adapted for use in guiding both towed and self-propelled or maneuverable submerged devices through water for such purposes as underwater exploration and mapping, detection of submarines and other underwater vessels and structures, study of marine plant and animal life and habitats, etc.

In the interests of both national defense and the advancement of scientific knowledge, exploration of the oceans, lakes and rivers of the world, especially at great depths, has become vitally important. It is, of course, impossible for all practical purposes to maintain any thorough surveillance over even a small part of this vast field by direct human visual inspection, as a consequence of which the extensive use of electronic sensing devices and detection gear, including such systems as sonar and television cameras, is now practically universal and mandatory. By far the major portion of this electronic surveillance, however, is effected by men and control ships or command vessels operating at or near the surface and using submerged devices towed by such ships. To increase the scope of such surveillance, the development of faster and more reliable methods of deploying the detection gear has been made the subject of intensive activity, aimed in particular at the goal of enabling submerged bodies housing such detection gear to be moved with maximum stability at relatively high speeds and at relatively great depths. One approach to the attainment of this goal has been the use of submerged devices which are self-propelled and maneuverable, i.e. not relegated to being towed behind a surface vessel.

Difficulties have been encountered, however, in attempting to implement this proposal, since the various available faired cable constructions are in general designed for use in conjunction with towed submerged bodies and not with such devices moving at perhaps greater speeds and in different directions than the surface vessel, even to the point of being located ahead of the surface vessel. Primarily it has been found that the heretofore known towing cables, even those provided with auxiliary external fairing or enclosure means having streamlined contours, are troubled, when so used, by a great deal of turbulence, which even in the case of a towed device not only limits the maximum possible speed of movement thereof but also frequently interferes with the reception of signals therefrom, and by a general lack of stability, i.e. a tendency to snake and even become twisted.

Although other factors may also contribute, it is believed that basically these difficulties stem from the nature of the various cable constructions. First, in the known towing cable constructions, there is generally provided adjacent the leading edge of the cable an elongated strength member in the form of a standard, twisted-strand wire cable of circular cross-section to which the fairing or streamlining means are loosely, i.e. pivotally or rotatably secured. Representative of such constructions are those disclosed in U.S. Patents Nos. 2,397,957, 2,435,956, 3,060,886, 3,176,646 and 3,304,364. In each of these constructions, the wire cable strength member is characterized by a relatively high torsional rigidity and has the mechanical properties of a beam of circular section, i.e. it has a longitudinal axis of symmetry, and its shear center is thus located at the centroid (the axis) of the section and is spaced rearwardly from the leading edge of the towing cable by at least the radius of the wire cable strength member. The term "shear center" or its equivalent "center of twist" is here used in accordance with the accepted mechanical sense thereof, the term being generally defined in the strength of materials field as the intersection of the horizontal axis of symmetry (the neutral axis) of the cross-section of a beam with the line of action of a vertical load when the latter is applied to the beam so as not to cause any twisting thereof.

At the same time, however, the relationship between the fairing and the strength member in each of these towing cables appears to be such as to locate the center of pressure of the cross-section of the combination effectively relatively close to the axis of the wire cable strength member. The term "center of pressure" as applied to the hydrodynamics of the system is here used in the same sense as it has in the field of aerodynamics, where it is generally defined as the point at which the resultant of the aerodynamic forces of lift and drag intersects the chord line of an airfoil (the chord line being the straight line connecting the leading edge of the airfoil cross-section to the trailing edge). Thus, the magnitude of corrective force couples which can be applied to these cables is relatively small, being limited by the small distance between the centers of twist and pressure. Moreover, the present day towing cables are generally characterized by a relatively high drag coefficient in the range of 0.1 and above, resulting both from the natures of the cable materials and the cable shapes or profiles. The higher the drag, of course, the greater the likelihood of turbulence as the cable is moved through the water, and also the less the depth which a given length of cable can attain even while being towed at relatively low speeds, let alone at high speeds in excess of 20 knots or so.

It is apparently a combination of these factors, i.e. the disadvantageous physical characteristics acting in concert with the location of the shear center relatively near the center of pressure, which leads to the hydrodynamic instability that characterizes the known cable constructions.

It is an object of the present invention, therefore, to provide a novel faired cable construction which is free of the disadvantages and drawbacks of known faired cable constructions.

It is another object of the present invention to provide such a faired cable construction which may be used in guiding not only a towed but also a self-propelled and maneuverable submerged device with maximum stability even at relatively high speeds and great depths.

More particularly, it is an important object of the present invention to provide a novel faired cable construction which is characterized by the location of the shear center of the strength member in the immediate vicinity of the leading edge of the cable and a considerably greater distance forward of the center of pressure of the cable than the centroid of the strength member section, as well as by low torsional rigidity and drag coefficient and by substantially neutral buoyancy.

A related object of the present invention is the provision of such a cable construction wherein both the strength member and the remainder of the cable fairing are integral, non-separable molded parts having uninterrupted streamlined outer contours.

Generally speaking, the objects of the present invention are attained through the provision of a faired cable having the outer cross-sectional contours of an airfoil so designed as to have its center of pressure approximately at the quarter chord position (as measured from the leading edge of the section). The forward part of the cross-section is constituted by or includes a rearwardly open channel-like or substantially U-shaped relatively less flexible strength member, this shape disposing its shear center considerably forward of its centroid and essentially in the immediate vicinity of the leading edge of the cable section. The aft part of the cross-section is attached to the rearwardmost end of the cable part which includes the strength member, e.g. at the ends of the legs of the U or flanges of the channel, and has the form of a relatively more flexible tail of substantially triangular shape. The strength member is made of high modulus filaments in a resin matrix, preferably glass filaments in an epoxy or epoxy/polyurethane resin, and generally has a specific gravity between about 1.25 and 2.25, most advantageously in excess of about 1.9. The aft part or tail section is made of isotactic foam, preferably the cured end product of a mixture of a liquid polyether polyurethane composition and small glass spheres available commercially under the trademark "Microballoons," and generally has a specific gravity between about 0.4 and 0.8, most advantageously between about 0.5 and 0.75. The particular values of specific gravity of these components chosen in any given cable should be such that the overall construction is relatively close to neutrally buoyant, i.e. characterized by a specific gravity generally between about 1.2 and 1.4, most advantageously not in excess of about 1.25, and has its center of gravity located at or slightly forward of the center of pressure.

A main power conductor, preferably a braided wire arrangement having the appropriate flexibility and extensibility characteristics needed, as well as the electrical properties to transmit electrical power for the propulsion system of the submerged device and its electronic apparatus, is received in the channel of the strength member and is overlaid by an insulation section, advantageously made of an unfilled polyurethane composition having the requisite electrical voltage breakdown properties and a specific gravity generally between about 1.05 and 1.15 and preferably about 1.1, which fills the channel up to (although it may go somewhat beyond) the region of juncture between the strength member and the tail or aft section. Suitable signal conductors, preferably also braided wire arrangements, for transmitting commands to and receiving intelligence signals from the electronic equipment are disposed in small grooves at the aft ends of the legs of the U-shaped strength member and may additionally be covered by an appropriate portion of the insulation if the insulating value or capacity of the tail section per se is deemed for any reason insufficient.

The use of a faired cable having a construction according to the present invention enables a submerged detection or exploration device connected thereto to be driven and steered by remote control or through the intermediary of the cable itself so as to run ahead or abreast of the surface command ship or control vessel, and if desired to be simply towed behind such vessel, with maximum stability even at high speeds and great depths, since there is a greater distance between the centers of twist and pressure than has heretofore been the case, making greater restoring moments possible. Nevertheless, despite its special integral construction, such a cable may be wound up on a suitably sized winch drum without any risk of incurring a permanent set, and it may be produced by a stepwise molding operation in non-sectioned continuous form of indeterminate length, ranging up to thousands of feet.

The foregoing and other objects, characteristics and advantages of the present invention will be more clearly understood from the following detailed description thereof when read in conjunction with the accompanying drawings, in which:

FIG. 1 is a fragmentary elevational view of a faired cable according to the present invention, also diagrammatically showing the submerged device and the surface or command vessel therefor;

FIG. 2 is a fragmentary, partly sectional, perspective view, on a greatly enlarged scale, of the faired cable according to one aspect of the present invention;

FIG. 2A is an enlarged transverse section through the strength member of the basic cable construction according to the present invention, the view being designed to illustrate some of the physical and mechanical principles involved;

FIGS. 3 and 4 are transverse cross-sectional views of somewhat modified embodiment of the cable construction according to the present invention;

FIG. 5 is a longitudinal section through an end coupling adapted to be used with such a cable and illustrates the manner of connecting the cable to the submerged device;

FIG. 5A is a perspective exploded view of the end coupling shown in FIG. 5;

FIGS. 5B, 5C and 5D are, respectively, sectional views taken along the lines 5B—5B, 5C—5C and 5D—5D in FIG. 5, FIG. 5D being drawn to a somewhat larger scale;

FIG. 5E is an enlarged, fragmentary, sectional view of the circled portion of the strength member filament arrangement within the confines of the end coupling;

FIG. 6 is a diagrammatic illustration of a production line multi-section apparatus for manufacturing continuous lengths of the faired cable according to the present invention;

FIG. 7 is a fragmentary, enlarged, partly sectional, elevational view of the first section of the apparatus and illustrates the filament impregnating stage of the formation of the strength member;

FIG. 8 is a fragmentary sectional view taken along the line 8—8 in FIG. 7;

FIG. 9 is a sectional view taken along the line 9—9 in FIG. 7 and illustrates the cross-sectional shape of the resin-impregnated filament strand emanating from the apparatus section shown in FIGS. 7 and 8;

FIG. 10 is a fragmentary, enlarged, partly sectional, elevational view of the second section of the apparatus shown in FIG. 6 and illustrates the final shaping and curing of the strength member;

FIG. 11 is a fragmentary sectional view taken along the line 11—11 in FIG. 10;

FIG. 12 is a sectional view taken along the line 12—12 in FIG. 10 and illustrates an intermediate cross-sectional shape of the impregnated filament strand emanating from the apparatus portion shown in FIG. 11;

FIGS. 13 and 14 are diagrammatic sectional views taken along the line 13—13 in FIG. 10, both showin a strand-compacting and curing press component of this section of the apparatus but in different stages of operation;

FIG. 15 is a sectional view taken along the line 15—15 in FIG. 10 and illustrates the compacted and cured strength member as it leaves the press shown in FIGS. 13 and 14;

FIG. 16 is a fragmentary, enlarged, elevational view of the third section of the apparatus shown in FIG. 6;

FIG. 17 is a fragmentary sectional view taken along the line 17—17 in FIG. 16 and illustrates the formation of the conductor-receiving channel and grooves in the strength member;

FIG. 18 is a sectional view taken along the line 18—18 in FIG. 16 and illustrates the finished strength member;

FIG. 19 is a sectional view taken along the line 19—19 in FIG. 16 and illustrates the conductor-laying operation;

FIG. 20 is a sectional view taken along the line 20—20 in FIG. 16 and shows the strength member with the conductors in place;

FIG. 21 is a fragmentary, enlarged, elevational view of the fourth section of the apparatus shown in FIG. 6;

FIGS. 22 and 23 are, respectively, sectional views taken along the lines 22—22 and 23—23 in FIG. 21 and illustrate the formation of the insulation section over the conductors;

FIGS. 24 and 25 are, respectively, fragmentary, diagrammatic, sectional views taken along the lines 24—24 and 25—25 in FIG. 21 and illustrate the formation of the aft or tail section of the cable;

FIGS. 26 and 27 are, respectively, fragmentary, enlarged elevational and top plan views of the fifth section of the apparatus shown in FIG. 6 and illustrate the finishing of the cable; and FIGS. 28 and 29 are, respectively, sectional views taken along the lines 28—28 and 29—29 in FIG. 26 and illustrate the cable prior and subsequent to the finishing operation.

Referring now to the drawings in greater detail, there is illustrated in FIG. 1 the stern of a surface vessel 30, e.g. an oceanographic exploration ship, riding on the surface of a body of water 31 and provided with a winch drum 32 rotatably supported on bearing blocks or brackets 33. Played out from the drum over an idler guide roll 34 and into the water is a length of cable 35 the construction of which constitutes the subject matter of the present invention, to be more fully described presently. The remote ends of the cable are connected to respective end couplings 36 (only one is shown), one of which is connected to the winch and the other of which is connected to an underwater detection or exploration device 37. The latter, which per se also constitutes no part of the present invention and thus will not be further described herein in any great detail, may for the purposes of this description be taken to be of a self-propelled or maneuverable type within the casing of which is housed any suitable underwater detection and/or scanning system, for example sonar or a television camera. Nevertheless, it should be realized that the device 37 need not be self-propelled but may be a towed device.

As clearly shown in FIGS. 2, 3 and 4, the cable according to a preferred aspect of the present invention has an airfoil cross-section and consists in general of a forward strength member 38 and an integral aft or tail member 39, the former being generally U-shaped in cross-section so as to provide a channel 38a which extends along the entire length of the strength member. Arranged within the channel 38a near the front edge or bottom of the latter is an electrical power conductor 40. The remainder of the channel 38a is filled with an electrical insulation section which is shown in FIG. 2, where it is designated 41, as extending up to the line of juncture between the strength and aft members 38 and 39. The strength member 38 at its rearwardmost end, i.e. at the end faces of the legs of the U, is further provided with a pair of grooves 42 into which are laid a pair of signal conductors 43. In the embodiment of FIG. 2, therefore, the conductors 43 are insulated by the aft or tail member 39, but if desired the insulation section, designated 41a for the cable 35a in FIG. 3 and 41b for the cable 35b in FIG. 4, may extend beyond the rear end of the strength member, i.e. beyond the juncture line and into the region of the tail member, so as to cover the signal conductors as well. Especially an arrangement such as that shown in FIG. 4 has an additional advantage, in that it enables a larger power conductor to be placed into the channel without any sacrifice of insulation, and in that it also provides a larger thickness of insulation for a normal or below normal size power conductor if that be deemed necessary.

The strength member 38 in essence comprises a mass of continous, longitudinally oriented, high modulus filaments 38', preferably glass filaments, embedded in or impregnated with a suitable binder or resin, e.g. an epoxy or epoxy/polyurethane resin. Merely by way of example, the binder may be composed of such materials as the following, all references to parts being by weight:

(a) A blend of 80 parts of an epoxy resin, such as is commercially available as a liquid uncured epoxy resin under the designation "Epon 826" (a condensation product of epichlorohydrin and bisphenol A, having an epoxy equivalent weight of 180–188 and a viscosity at 25° C. of 6500–9500 centipoises), with 20 parts of a polyamide resin, such as is commercially available as a fluid uncured polymer under the designation "Versamid 140" (a condensation product of linoleic acid and polyamines, having an amine value of 370–400 and a Brookfield viscosity at 75° C. of 2.0–6.0 poises).

(b) A blend of 100 parts of an epoxy resin, such as is commercially available as a liquid uncured epoxy resin under the designation "ERL 2795" (made from a liquid diglycidyl ether of bisphenol A [available under the designation "ERL 2774" with a molecular weight of approximately 380, epoxy equivalent weight of 180–195, and viscosity at 25° C. of 11,000–13,500 centipoises] diluted with 13% butyl glycidyl ether, and having an epoxy equivalent weight of 179–194 and a viscosity at 25° C. of 500–700 centipoises), with 29 parts of a hardener or curing agent such as is commercially available under the designation "ZZL 0822" (a bis amino alkyl ether of a polyalkylene glycol, having an amine equivalent of 8.5–9.1, a specific gravity of 1.005–1.015, and a viscosity at 25° C. of 10–25 centistokes).

(c) A blend of 50 parts of an epoxy resin, such as is commercially available as a liquid uncured epoxy resin under the designation "DER 332" (a diglycidyl ether of bisphenol A, having an epoxy equivalent weight of 172–176 and a viscosity at 25° C. of 4000–5500 centipoises), with 50 parts of a polyether-based urethane polymer, such as is commercially available under the designation "Vibrathane B-600" (polytetramethyleneglycol polyurethane which is liquid at room temperature and has 4.0–4.3% free NCO, an amine equivalent of 1015±50, a specific gravity of 1.06, and a viscosity of 15 poises at 158° F. and 6 poises at 212° F.), and with 26 parts of a curative for epoxy/polyurethane blends, such as is commercially available under the designation "MOCA" (methylene-bis-ortho-chloroaniline).

(d) A blend of 50 parts of the "Epon 826" resin with 50 parts of the "Vibrathane B-600" polyether polyurethane and 25.3 parts of the "MOCA" curative.

(e) A blend of 50 parts of the "Epon 826" epoxy resin with 50 parts of a polyether-polyurethane prepolymer, such as is commercially available under the designation "Adiprene L-100" (a reaction product of a diisocyanate and a polyalkylene ethyl glycol which is liquid at room temperature), and with 30 parts of the "MOCA" curative.

It will be understood that the design of the strength member in terms of the relative proportions of the high modulus filaments and the binder will be primarily determined as a function of the maximum desired or rated load carrying capability of the cable and the tensile strength of the filaments (in particular the ratio of the design load to the tensile strength of the filaments), but in general a system utilizing a 60 to 80% volume loading of glass, using type S–901–150G glass filament rovings produced by Owens-Corning Fiberglas Corp., for example, with the remainder being binder, is sufficient for most practical uses of the cable.

As previously indicated, the strength member 38 and the aft or tail member 39 constitute an integral unit (by virtue of the molding thereof in the manner still to be described), and together they have the cross-sectional shape of an airfoil that is symmetric with respect to its chord line. The particular shape of the airfoil most advantageous for the practice of the present invention is one known as "NACA–0018" (as defined in "Theory of Wing Sections" by Abbott and Doenhoff, Dover Paperback No. S–558, page 325), the chord length of which is preferably about 6 times as great as its maximum transverse cross-sectional dimension, so as to minimize hydrodynamic drag. This effect is at the same time enhanced by the molding of the cable and especially the strength member of appropriate materials so as to have as smooth a surface as possible.

Referring now specifically to FIG. 2A, the manner in which the farthest possible location of the shear center, i.e. the center of torsion or twist, of the cable forwardly of the center of pressure is achieved will be understood by viewing the strength member in cross-section as a channel-shaped beam B having a web W and two flanges F defining an interior channel C. From studies of beams on the basis of ordinary "strength of materials" considerations, it is well known that in a thin channel beam the shear center lies not along the centroid of the beam section but rather outside of the section, on the side of the web facing away from the flanges of the beam. Thus, with reference to FIG. 2A, as applied to the beam B, this would seem to indicate that the shear center should lie to the right of the web W. Where the cross-sectional thickness T of the web W becomes sufficiently great as to constitute a substantial part of the cross-sectional length L of the beam, however, the shear center may be displaced from its theoretical position toward the beam, i.e. to the left in FIG. 2A, and ultimately may even be located within the geometrical confines of the beam, the precise point depending on the relative strengths of the web and the flanges.

For the purposes of the present invention, it has been found that the cross-sectional or chord length of the filament-and-binder strength member 38 (dimension L of the beam B) advantageously should be between about 30 and 40%, preferably about ⅓, of the overall chord length of the cable (the dimension between the right and left extremities in FIGS. 2, 3 and 4), and that the chord length of the portion of the strength member from the leading edge of the cable to the bottom of the channel 38$a$ (dimension T of the beam B) should be between about 30 and 40%, preferably up to about ⅓, of the overall chord length of the strength member. In general, dimension L should be about three times the dimension T. Concomitantly, since the ratio of maximum transverse thickness of the cable to its chord length should preferably be on the order of about 1:6, as previously indicated, the maximum cross-sectional width of the strength member (dimension D of the beam B), which will ordinarily be its width at the open end of the channel, should be between about 45 and 55%, preferably about ½, of the chord length of the strength member. In general, therefore, dimension L should be about double dimension D.

When constructed as herein set forth, a complete cable, advantageously having a chord length of about 3 inches, is found to have its center of pressure and its center of gravity located at about the quarter chord position (¼ of the total chord length as measured from the leading or forward edge of the strength member), while its center of torsion or shear center is located in the immediate vicinity of the leading edge of the cable, possibly even slightly forwardly of that edge, but not farther to the rear than the front one third of the chord length of the strength member. The resulant cable is thereby possessed of low torsional rigidity, has low hydrodynamic drag, and is characterized by almost neutral buoyancy and high stability when being moved through water at relatively high speeds. Moreover, the strength member, though having substantial bending strength by virtue of being made in the shape of a channel and of a relatively high loading of high modulus filaments in a cured resin binder, is nevertheless sufficiently flexible to permit the cable to be wound, without any substantial risk of suffering a permanent set that would be inimical to stability, onto a winch drum (in the light of strain conditions that will occur on winding, 8-foot drums are contemplated for use with glass filament cables) with the leading cable edge adjacent the drum surface. The filament component of the strength member, of course, takes up the entire load on the cable.

The aft or tail member 39 of the cable, it will be apparent, must be relatively more flexible than the strength member, and it must be made of a material which not only provides the requisite flexibility but also is readily adaptable to a molding operation and exhibits an appropriate degree of bonding compatibility with the resin matrix or binder of the strength member. With the latter preferably utilizing a resin based on epoxy or epoxy/polyurethane compositions, the use of a similar material in the tail member is clearly indicated. For reasons previously set forth, the composite material of which the tail member is made must have a specific gravity considerably less than 1.0, preferably around 0.5, and inasmuch as the resin generally has a specific gravity in excess of 1.0, the resin must, therefore, be supplemented by a filler having a low specific gravity, generally in the range of about 0.3 to 0.4. The filler, of course, must also be compatible with the resin matrix employed and easily dispersible therein, and it should have no adverse effects on the moldability of the composite, i.e. the latter should be soft and dough-like to facilitate filling of the mold cavity. Moreover, the filler should have a resistance to water and oil at least comparable to that of the resin, and should have a relatively high compressive strength (strengths on the order of about 1700 p.s.i. or more are contemplated for the purposes of the present invention). As previously indicated, a composite formed primarily of a liquid polyether polyurethane composition, such as a blend of 100 parts of the "Adiprene L–100" prepolymer with 11 parts of the "MOCA" curative, admixed with 28 parts of glass microspheres (designated 39′ in FIGS. 2, 3 and 4), such as are commercially available under the designation "IG–101 Micro-balloon" (sodium borosilicate glass spheres with an average particle size of 65 microns [range 44–250], a compressive strength of up to 5000 p.s.i. [50% over 1500 p.s.i.], and a specific gravity of 0.35), fulfills these requirements although such composites may be formed of other resins of the types used as the strength member binder, e.g. epoxy and polyamide resin compositions, and/or with other low specific gravity fillers, e.g. phenolic, epoxy or metal microspheres, glass microtubes, etc.

The electrical conductors 40 and 43, of course, must have the minimum electrical and mechanical properties which will be required to enable them to function adequately under the contemplated conditions of use of the cable. Thus, electrical specifications for the power conductor 40 would include appropriate voltage, current and resistivity ratings, while the mechanical specifications would include percentage elongation, flexibility and collapse resistance ratings. Merely by way of example, assuming that the electrical power conductor 40 is to be one having minimum electrical properties equivalent to those of a copper ribbon the dimensions of which are approximately 0.44 x 0.75 inch, and is to be rated electrically for 5500 volts, 285 amperes and 0.26 ohm/1000 feet, and mechanically for a minimum elongation of 2.7%, high flexibility to accommodate cable flexure both on the drum and in the water, and high resistance to collapse under external pressure (both hydrostatic and mechanical), these specifications are optimally met, in accordance with the present invention, by a braided conductor arrangement which, as indicated diagrammatically in FIGS. 2 to 4, comprises two stacks of six 0.020 x 0.187 inch braided wire conductors (available commercially under designation Alpha Flat Braid #1231), the two stacks of conductors being consolidated into a unitary structure by being wrapped in any suitable electrical insulation sheet material, e.g. "Teflon" film tape. For the purposes of the present invention, a single power conductor is sufficient since it is contemplated to ground the electrical equipment in the submerged device to the surrounding body of water, e.g. sea water, using the latter as the return electrical path for the power circuit. If desired, of course, a double conductor can be used with proper insulation to complete the circuit through the cable and independently of the body of water.

Like consideration apply to the signal conductors 43. Thus, assuming that these conductors are to have minimum electrical properties equivalent to those of #20 or #30 copper wire while being capable of a minimum 2.7% elongation without permanent deformation, it is found again that braided wire conductors (for example such as are available commercially under the designation Alpha Flat Braid #1221) optimally meet such specifications.

The insulation section 41 (or 41a or 41b) for use in a cable according to the present invention should have an appropriately high breakdown voltage rating, a specific gravity as close to 1.0 as possible, e.g. between 1.0 and 1.2, and sufficient tensile strength to insure good tear resistance and allow strains of 5% without failure. An unfilled cured polyether polyurethane composition having a breakdown voltage of not less than 250 volts per mil, a Young's modulus on the order of about $8.0 \times 10^4$ p.s.i., and a specific gravity of about 1.106, e.g. a blend of 100 parts of the "Adiprene L–100" prepolymer with 11 parts of the "MOCA" curative, optimally meets these requirements.

The manufacture of a continuous faired cable of indeterminate length and having the characteristics hereinbefore set out will now be described with reference to FIGS. 6 to 29 of the drawings. As diagrammatically illustrated in FIG. 6, an appropriate cable-forming apparatus 44 for this purpose may be considered as comprising an assembly line-like set-up including five sections designated, respectively, by numerals I to V. Of these, section I comprises the means for effecting a resin impregnation of the bundle of filaments which will ultimately constitute the load bearing component of the strength member. Section II comprises the means for expelling excess resin from the impregnated filament strand and for effecting the curing and shaping thereof to the final outer contours of the strength member. Section III comprises the means for finishing the strength member by provision of the required conductor-receiving grooves and channel and for laying the respective conductors in place. Section IV comprises the means for applying the insulation section and the aft or tail member to the strength member to complete the cable, and section V comprises the means for finishing the completed cable preparatory to removal thereof for storage and subsequent attachment of end couplings and use.

The details of the various components of the apparatus line 44 will best be comprehended from the following description of a cable manufacturing operaion. For the purposes of this description it will be assumed that a manufacturing operation is in progress, and that a cable such as that designated 35a in FIG. 3 is being produced.

A completed and finished cable portion 35a is shown in FIGS. 6, 26, 27 and 29 as extending beyond the apparatus section V, and other portions of the cable in respective lesser stages of completion are located in the various prior sections of the apparatus 44. It will be understood that each apparatus section works on only one cable portion at a time, and that each such cable portion is advanced stepwise through the apparatus, being built up by stages to the final product.

As the next set of steps is to be commenced, therefore, in section V the finished cable is moved, by means to be described later, toward a wind-up drum (not shown). Concomitantly, in section I an appropriate number of continuous high modulus filaments, e.g. glass filament rovings, are drawn from a multiple end beam (not shown) and are fed through a set of combs and gathering rollers (not shown) into a unitary multifilament bundle or strand 45 (FIGS. 6 and 7). The gathered bundle of filaments, in which all the filaments are essentially parallel to one another, passes into and through the uppermost region of an annular peripheral channel or groove 46 (FIG. 8) of a flanged bottom roll 47 and is there compacted to a certain extent in a passageway defined between the bottom of the channel and the lowermost region of the outer periphery of a top roll 48 which projects with a smooth sliding fit between the flanges of the roll 47.

As the bundle of filaments 45 enters this passageway, it is impregnated with the desired resin binder 49 which is dispensed from a suitable source 50 onto the filament bundle at the entrance to the "nip" of the rolls 47 and 48. In general, the rate of addition of the binder should suffice to establish and maintain at that location a bank 51 of the binder adequate to attain the desired degree of impregnation. Excess resin may be collected and directed to a disposal point by any suitable drain trough arrangement 53 or the like extending into the groove 46 of the roll 47 from below the path of movement of the filament bundle 45. While confined between the rolls 47 and 48 and within the groove 46, the impregnated filament bundle has the cross-sectional shape illustrated in FIG. 8 and designated 45a, but as it leaves the confines of the rolls 47–48 it tends to bloom somewhat and attain the cross-sectional shape illustrated in FIG. 9 and designated 45b.

The resin supply means 49 has been schematically shown in FIG. 7 as being in the nature of a simple tilted receptacle, which may be operated manually or mechanically, but it should be understood that it may comprise any other type of apparatus suitable for the purpose, such as a mixing head provided with any suitable dispensing orifice or spout arrangement. It should also be realized that since almost any resin binder of the types contemplated for use in the manufacture of cables according to this invention will have a relatively short pot life, it will ordinarily be advantageous to formulate the resin in batches, rather than maintaining a continuous supply, especially in view of the fact that the manufacturing operation consists of a sequence of steps which requires the movement of the cable as an entity to be interrupted periodically.

Concurrently, the previously impregnated part of the filament bundle 45b enters section II of the apparatus line 44, where it is first passed between a pair of spaced rolls 54 (FIGS. 6, 10 and 11) which change it into a more elongated cross-sectional shape, designated 45c in FIG. 11. Upon leaving the confines of the rolls 54, the impregnated filament bundle again tends to bloom somewhat and assume a more oval configuration, designated 45d in FIG. 12.

The impregnated filament bundle 45d then enters a longitudinal upwardly open channel 55 (FIGS. 10 and 13) of the lower mold member 56 of a curing press 57. The channel 55, which extends the entire length of the press (a distance of 12 feet, for example), is rounded at its bottom region to the contours and curvature to be imparted to the forward portion of the body of the cable.

The upper section of the chanel 55 is vertically straight-sided so as to receive with a close sliding fit an elongated upper mold member or plunger 58 depending downwardly from the vertically movable ram or cross head 59 of the press 57 and also extending along the entire length of the press. The arrangement is such that when the press is closed (FIG. 14), the space in the bottom region of the channel 55 below the mold member 58 has the precise outer cross-sectional dimensions and contours of the ultimately desired strength member of the cable, except that in the chord length (vertical) direction the height of the cavity may be slightly in excess of the desired final dimension.

As diagrammatically shown in FIGS. 6 and 10, a squeezing roller 60 is arranged to travel reciprocally through the upper portion of the channel 55 from a starting position, indicated in broken lines in FIG. 10, outside the press just at the cable exit end of the press (at the right hand side of the figure) to the entry end thereof (at the left hand side of the figure) and back, for the purpose of squeezing out excess resin and effecting a preliminary compaction of the filament bundle preparatory to the closing of the press. Squeezed out resin leaves the press via a drain funnel 61 into a trough or other conduit or receptacle 62 for disposal. The mold members 56 and 58 of the press are also provided with respective heating means 63 and 64, shown as being in the nature of electric resistance heaters although they may be heating fluid conduits, which extend somewhat less than the press length. In a 12-foot long press, for example, the press is unheated for about 1 foot in from each end.

During this step of the sequence, as soon as the squeezing roller has been returned to its starting position, the ram 59 is lowered to close the press so as to compact the impregnated filament bundle to its final shape, designated 45e in FIG. 14, and cure the resin binder. At this time, the last previously cured portion of the cable, which will hereinafter be referred to as the strength member blank and is designated 45f in FIG. 15, is resting outside the press in a guide trough 65, which serves to prevent any possible distortion of the still warm blank and, if desired, may also be equipped with internal conduits to permit liquid cooling of the blank. It will be understood that the small segment of this previously cured strength member blank which is still within the unheated exit region of the press, will also serve to close off the respective end of the mold cavity during the current curing operation. As soon as the latter is completed, the press is opened preparatory to the next step movement of the cable through the apparatus.

Also concurrently with the foregoing, in section III of the apparatus line 44, the previously cured strength member blank portion 45f is treated to form the signal conductor-receiving grooves and the power conductor-receiving central channel therein. To this end, a framework 66, preferably in the form of a carriage (FIGS. 16 and 17) arranged on rails 67 at opposite sides of the trough 65, is provided. The carriage supports a drive motor 68 which is connected by means of any suitable type of transmission belt 69 to pulleys 70, 71 and 72 mounted on respective shafts 73, 74 and 75 journaled in the frame of the carriage 66 and extending across the trough 65. Secured to the shaft 73 is a pair of small groove-forming grinding wheels 76, while a larger channel-forming grinding wheel 77 is mounted on the shaft 74. The shaft 75 carries a large and wide grinding or sanding wheel 78 which is somewhat wider than the entire strength member blank 45f.

Accordingly, traversing the carriage 66 along the trough 65 from the right to the left as seen in FIG. 16 causes two grooves and an intermediate channel to be formed in the upper surface of the blank 45f, while at the same time small amounts of material are removed from the top surface of the latter by the wheel 78 to reduce the height of the blank (the chord length of the strength member) to the final desired value. The blank, designated 45g in FIG. 18, at the end of this operation has the cross-sectional appearance of the finished strength member. It will be understood that the use of a traversable grinding mechanism is not essential and that in lieu thereof a stationary set of grinding wheels may be employed to form the necessary grooves and the central channel in and to reduce the height of the blank 45f as the same is moved past the grinding wheels, but the movable arrangement has the advantage of enabling small amounts of material to be removed in multiple passes to permit finer control of this operation.

As the cable was being stepped along, of course, to reach its current position, the previously finished strength member portion 45g passed underneath a conductor laying apparatus 79 which has been schematically illustrated as comprising a frame 79a (FIGS. 16 and 19) on which are provided a large supply roll or other source 80 of the power conductor 40 and a pair of smaller supply spools 81 of the signal conductors 43, as well as respective guide and pressing rolls or wheels 82 and 83. Any portion of the blank that has passed the apparatus 79 looks as illustrated in FIG. 20 and is there designated 45h.

Again concomitantly with the foregoing, as the previously conductor-equipped strength member blank 45h is stepped into section IV of the apparatus line 44, it is initially moved past a set of spouts 84 (FIGS. 6, 21 and 22) from which the resin for the insulation section of the cable is deposited onto the strength member blank 45h. In the mode of operation here illustrated, the arrangement is such as would be used for forming an insulation section such as 45a illustrated in FIG. 3. Thus, sufficient resin is deposited to fill the empty portions of the channel and grooves in the blank and also to blanket the top surface of the blank slightly beyond the remote edges of the signal conductor-receiving grooves. The blank in this condition is designated 45i in FIG. 22. Nevertheless, it will be understood that the same approach could be used for forming an insulation section such as 41b shown in FIG. 4, while use of the two outer spouts 84 would be obviated if an insulation section such as 41 in FIG. 2 were to be formed.

Immediately after passing the spouts 84, the insulation-covered blank 45i enters the longitudinal channel 85 of a lower mold member 86 of a curing press 87 where, upon closing of the press by the lowering of an upper mold member 88 (FIG. 23) provided with suitable heating means 89 of either the electric resistance or fluid conducting type, the resin is cured to form the insulation section 41a. The so-treated portion of the strength member, designated 45j in FIG. 23, is thus completed.

Also concurrently with the foregoing, the previously completed portion of the strength member was moved into a press 90 (FIGS. 6, 21, 24 and 25) constituting a part of section IV of the apparatus line 44. The press 90 comprises a lower mold member 91 having a channel 92 therein for receiving and supporting the said portion of the strength member, designated 45k in FIG. 24, and an upper split mold member composed of two sections 93 and 94 slidably mounted on the lower member 91 and arranged to be moved toward and away from each other, as well as clamped together when in the closed position, by suitable fluid pressure devices, e.g. hydraulic piston and cylinder means 95 and 96. The mold sections 93 and 94 are also in close sliding contact at one end with the upper mold member 88 of the press 87 (FIGS. 6 and 21) and at the other end with a pair of cable-clamping members 97 and 98 (FIGS. 6, 21 and 25) actuatable by respective fluid pressure devices, e.g. hydraulic or pneumatic piston and cylinder means 99 and 100. The interior surfaces of the mold sections as well as of the clamping members are contoured to define, when fully closed, respective cavities the cross-sections of which are precisely in accordance with the dimensions and shape of the tail member of the cable to be formed. A dispensing nozzle or pouring spout 101 (or, if desired, a multiple arrangement thereof) overlies the parting line of the mold sections 93 and 94 (FIGS. 6, 21 and 24).

In this stage of the operation, therefore, when the previously completed strength member portion 45j comes to rest in the lower mold member 91 of the press 90, upon closing of the press 87 by lowering of the upper mold member 88 thereof, and with the upper mold sections 93 and 94 of the press 90 separated (preferably to the extent of about ½ inch at the parting line, as indicated in phantom outline in FIG. 24), the filler-containing resin 102, e.g. a polyurethane composition as hereinbefore set forth admixed with glass microspheres, for the aft or tail member is dispensed into the mold cavity and onto the top of the strength member portion 45k until the cavity is substantially filled in its entirety. The piston and cylinder means 95 and 96 are then actuated to close the mold sections 93 and 94 against each other (as indicated in solid lines in FIG. 24) so as to shape the resin mass 102 to its desired form and to cure the same while also molding it directly to the underlying strength member portion 45k. Suitable electric or fluid heating means 103 may be provided in the mold sections 93 and 94 to facilitate this operation. During this stage, in which one end of the mold cavity defined by the sections 93 and 94 is closed by the upper mold member 88 of the press 87, the clamping members 97 and 98 are closed tightly against the last previously cured aft or tail member portion, designated 102a in FIG. 25, and to a lesser extent also against the uppermost portion of the associated strength member portion, designated 45m in FIG. 25, resting in a support trough 104, whereby the aforesaid mold cavity is also closed at its other end by the clamping member acting in concert with the cured cable portion 102a–45m. Any escape of the molding composition 102 is thereby effectively prevented.

The movement of the cable hereinbefore referred to, by which the finished cable 35a was moved toward the wind-up drum and all of the various incomplete cable portions were advanced or stepped into the respective operating elements of the apparatus sections I to IV, is effected by a friction drive arrangement 105 (FIGS. 6, 26 and 27) constituting a part of section V of the apparatus line 44. In its preferred form, the drive means 105 comprises a pair of endless belts 106 and 107, preferably high friction rubber belts having toothed or otherwise roughened outer surfaces, adapted to be in frictional gripping engagement with the opposite faces of the completed cable. The belts are arranged on respective systems of rollers 108 and 109 journalled in a frame 110 and jointly driven through any suitable transmission means by means of a motor 111 mounted on the frame.

The completed cable 102a–45m which was drawn away from the press 90 during the aforesaid movement was, of course, not finished in the sense that its surfaces were marred somewhat by flash generated at the parting line between the mold sections 93 and 94 and at the parting lines between each of these sections and the underlying lower mold member 91, as indicated at 112 and 113 in FIGS. 26 to 28. For the purpose of removing this flash, there are provided in the apparatus section V just before the drive means 105 (as viewed in the direction of movement of the cable) a top grinding wheel 114 and a pair of side grinding wheels 115 all of which are preferably driven directly or indirectly by the motor 111 through the intermediary of any suitable transmission means. In this manner, operation of the grinding wheels 114 and 115 only when the cable is in motion is assured.

As soon as the set of the foregoing concurrent operations is terminated, with the presses 57, 87 and 90 and the clamping members 97–98 opened, the motor 111 is again activated to advance the cable another step for the performance of another set of such operations on the respective newly arrived cable portions in the various apparatus sections I to V, and this is then repeated again and again until a faired cable of the desired length has been obtained.

Since means in the form of end couplings 36 must be provided to enable the faired cable to be connected to the winding drum and the underwater device, predetermined lengths of the filament bundle 45 must initially be left free and unimpregnated during the cable manufacturing operation hereinbefore described, care being taken to avoid any damage to such unimpregnated filaments until the end couplings are attached thereto. At the same time of course, enough of the power and signal conductors 40 and 43 must extend beyond the ends of the molded cable body 35 (or 35a or 35b) to enable the conductors to extend through the couplings and to be connected to the respective electric circuit elements on the control vessel and in the submerged device.

Referring now to FIGS. 5 and 5A in particular, an end coupling 36 suited for use in the implementation of the present invention may comprise an outer hollow stainless steel casing 116 which is adapted to receive a molded fiberglass plug 117 and a stainless steel sleeve 118. The casing is generally cylindrical over the major portion of its length and has external threads 119 at one end for connection to the submerged device or an adjunct of the winding drum. The interior generally cylindrical bore 120 of the casing tapers at the other end of the latter, as shown at 120a, while the plug 117 is cylindrical in its middle region and tapered at its opposite end regions 117a and 117b, the axial length of the plug being somewhat greater than that of the casing 116. The sleeve 118 has a cylindrical exterior surface and a conically tapered interior bore 121, i.e. its wall is wedge-shaped in axial cross-section. As clearly shown in FIG. 5A, the plug 117 is further provided with a relatively wide rectangular axial bore 122 and a pair of relatively smaller rectangular bores 123 on opposite sides of and parallel to the bore 122.

To connect the faired cable to the end coupling 36, the unimpregnated end region of the filament bundle 45 is threaded through the casing 116 and around the as yet not inserted plug 117, at which time the filaments may also be sectionalized into a plurality of circumferential layers separated radially by preimpregnated circumferential layers of glass cloth 124 (see FIG. 5E) for the purpose of attaining maximum interlaminar shear properties between the filaments in the coupling. At the same time, the power conductor 40 and the signal conductors 43 are threaded through the bores 122 and 123 of the plug, respectively, and the wedge sleeve 118 is fitted over the filament and glass cloth composite onto the end 117b of the plug 117. During these operations, an epoxy resin binder impregnant is applied to the filaments between the cable body and the end coupling as well as to the filament and glass cloth composite, and the entire assembly is then drawn into the casing 116 to attain the condition shown in FIG. 5. The portion of the bundle of filaments between the cable body and the coupling may be wrapped with one or more layers of a resin-impregnated glass cloth 125 (FIGS. 5 and 5D). The cable and coupling are then subjected to longitudinal tension for tightening the assembly and to a curing operation for the resin-impregnant. As a final step, a flexible resin fairing body, conforming generally to the contours of the cable body, may be molded to the stretch of filaments between the cable body and the end coupling, but this will, of course, be done only at that en dof the cable which is ultimately to be connected to the submerged device.

I will be understood that both the cable construction and the manufacture thereof herein disclosed are susceptible to many variations and modifications. Merely by way of example, the distribution of the load bearing filaments constituting the strength member may be different from that shown, subject only to the requirement that the overall filament arrangement must have the character of a beam section which will enable the shear center of the cable to be located at a considerably greater distance forward of the center of pressure of the cable that the centroid of the beam or strength member section. Thus, within this ambit the strength member, i.e. the filaments per se, may actually be arranged in the form of a thin channel beam encased without the possibility of relative motion in the remainder of the cable body formed of a suitable resin binder so that the entire outer surface region of the cable is defined by filament-free resin. Also, though glass filaments are preferred for use as the strength member, other high modulus filaments of low extensibility, e.g. steel wires, may be used. Where metallic filaments are used, of course, it will be also necessary to provide and maintain an adequate insulation between the electrical conductors and the strength member.

Other variants within the spirit and scope of the present invention, as defined by the hitherto appended claims, will readily suggest themselves to those skilled in the art.

Having thus described the invention, what is claimed and desired to be protected by Letters Patent is:

1. A continuous, longitudinally unsectioned, faired cable of substantial length and the body of which has the cross-sectional shape of an airfoil that is symmetric with respect to the chord line thereof, said body comprising a strength member extending longitudinally of the cable and secured to the remainder of said body in a manner to prevent relative movement therebetween, said strength member being disposed within the confines of the forward one-third portion of said body as measured along the chord line thereof and imparting to said forward portion a relatively lower flexibility than that of said remainder of said body, the center of gravity of the cable being located approximately at or slightly forward of the center of pressure thereof, and said strength member being substantially U-shaped in cross-section and having a central channel which is open toward the aft edge of said body, the shear center of said strength member thereby being located in the immediate vicinity of the leading edge of the cable and at a considerably greater distance forward of the center of pressure of the cable than the centroid of the strength member section.

2. A faired cable according to claim 1, wherein said strength member comprises a multiplicity of substantially parallel, high modulus, longitudinally extending, continuous filaments embedded in a resin binder, and the part of said remainder of said body located aft of said strength member comprises a resin matrix having incorporated therein a specific gravity-reducing filler material.

3. A faired cable according to claim 2, wherein said strength member is constituted by glass filaments embedded in a material or blend of materials selected from the group consisting of epoxy, polyurethane and polyamide resins, and wherein said aft part of said body is constituted by a polyurethane resin admixed with glass microspheres.

4. A faired cable according to claim 1, said strength member comprising a plurality of substantially parallel, high modulus, continuous filaments extending longitudinally of said body and embedded in a resin binder matrix molded to the prescribed cross-sectional shape.

5. A faired cable according to claim 4, wherein said filaments are glass filaments.

6. A faired cable according to claim 4, wherein said filaments are metal filaments.

7. A faired cable according to claim 4, wherein said resin binder comprises a material or blend of materials selected from the group consisting of epoxy, polyurethane and polyamide resins.

8. A faired cable according to claim 4, wherein said forward portion of said body in its entirety constitutes said strength member, and said filaments are glass filaments distributed over the entire cross-sectional area of said portion of said body.

9. A faired cable according to claim 8, wherein said strength member comprises a volume loading of about 60–80% glass filaments and 40–20% resin binder.

10. A faired cable according to claim 9 wherein, said resin binder comprises a material or blend of materials selected from the group consisting of epoxy, polyurethane and polyamide resins.

11. A faired cable according to claim 8, the remainder of said body being constituted by an aft or tail member molded to the rearwardly facing ends of the legs of said strength member.

12. A faired cable according to claim 11, said aft or tail member being constituted by a polyurethane resin matrix having incorporated therein glass microspheres.

13. A faired cable according to claim 8, further comprising at least one electric conductor received within and occupying the forward portion of said channel of said strength member, and an electrical insulation resin filling the remainder of said channel.

14. A faired cable according to claim 13, further comprising at least one additional electric conductor located at the rearwardly facing ends of the legs of said strength member, and the remainder of said body being constituted by an aft or tail member molded to said rearwardly facing ends of the legs of said strength member and overlying said additional conductor.

15. A faired cable according to claim 14, said insulation resin extending beyond the open end of said channel and over said additional conductor intermediate said aft or tail member and said strength member.

References Cited

UNITED STATES PATENTS 3,304,364   2/1967   Hetherington _____ 174—101.5

LEWIS H. MYERS, *Primary Examiner.*

E. A. GOLDBERG, *Assistant Examiner.*

U.S. Cl. X.R.

174—70, 133; 114—235; 29—592; 264—250, 154

UNITED STATES PATENT OFFICE
CERTIFICATE OF CORRECTION

Patent No. 3,443,020  May 6, 1969

Henry H. Loshigian

It is certified that error appears in the above identified patent and that said Letters Patent are hereby corrected as shown below:

Column 1, line 30 and column 3, line 45, "isotactic", each occurrence, should read -- syntactic --. Column 5, line 4, "showin" should read -- showing --. Column 6, lines 62 and 63, "curvative" should read -- curative --. Column 8, line 9, "resulant" should read -- resultant --. Column 9, line 26, "consideration" should read -- considerations --; line 72, "operaion" should read -- operation --. Column 13, line 19, cancel "each other". Column 14, line 65, "en dof" should read -- end of --; line 67, "I" should read -- It --. Column 15, line 16, "hitherto" should read -- hereto --.

Signed and sealed this 21st day of April 1970.

(SEAL)
Attest:

Edward M. Fletcher, Jr.  WILLIAM E. SCHUYLER, JR.
Attesting Officer  Commissioner of Patents